United States Patent [19]

Wolner et al.

[11] Patent Number: 5,186,289

[45] Date of Patent: Feb. 16, 1993

[54] RETRACTABLE LIFELINE SAFETY DEVICE

[75] Inventors: James T. Wolner, Red Wing, Minn.; Duncan C. Engh, Hagger City, Wis.

[73] Assignee: D B Industries, Inc., Red Wing, Minn.

[21] Appl. No.: 604,758

[22] Filed: Oct. 26, 1990

[51] Int. Cl.$^5$ ............................................. F16D 59/00
[52] U.S. Cl. .................................. 188/180; 188/65.1; 182/232
[58] Field of Search ....................... 188/180, 65.1, 65.2, 188/268, 290; 182/232, 231, 236, 237, 5, 18, 233

[56] References Cited

U.S. PATENT DOCUMENTS

| | | | |
|---|---|---|---|
| 2,546,202 | 3/1951 | Trouin | 188/180 |
| 2,896,912 | 7/1959 | Faugier et al. | |
| 2,990,131 | 6/1961 | Carlsson | |
| 3,760,910 | 9/1973 | Koshihara | 188/180 |
| 4,088,201 | 5/1978 | MacFarlane | 182/5 |
| 4,480,716 | 11/1984 | Soubry et al. | 182/233 |
| 4,511,123 | 4/1985 | Ostrobrod | 254/364 |
| 4,523,664 | 6/1985 | Soubry et al. | 182/233 |
| 4,688,659 | 8/1987 | Sheu | 182/233 X |
| 4,877,110 | 10/1989 | Wolner | 182/232 |

OTHER PUBLICATIONS

BH/SALA Model SB 57 Fall Arrest Safety Block Servicing Manual.
Drawing No. 720-00-00 titled Safety Block SB 57.
BH/SALA Model SB 150 Fall Arrest Safety Block Servicing Manual.
DBI/SALA sales brochure showing, on page SB-2, model SB 57 & model SB150 Safety Blocks.

Primary Examiner—Margaret A. Focarino
Assistant Examiner—Carla Mattix
Attorney, Agent, or Firm—Moore & Hansen

[57] ABSTRACT

A retractable lifeline safety device usable by workers performing tasks at great heights above the ground. The mechanical components of the safety device are contained within a sealed housing that is filled with a viscous fluid. The sealed housing prevents the introduction of dirt, moisture and other foreign matter into the mechanical mechanism of the safety device, reducing the likelihood that those components may be fouled by dirt and corrosion, which in turn could greatly reduce the effectiveness of the safety device. The safety device is attached to the structure on which the worker is performing the task, and a lifeline such as a cable is withdrawn from the housing thereof, the end of which is attached to a belt or harness worn by the worker. The cable may be easily drawn out of the housing in response to the worker moving about normally in the appropriate work space, and the cable is automatically drawn back into the housing of the safety device as the worker draws closer thereto. However, should the worker fall, a brake within the safety device is automatically engaged by a centrifugal clutch, stopping the worker's descent.

23 Claims, 4 Drawing Sheets

RETRACTABLE LIFELINE SAFETY DEVICE

BACKGROUND OF THE INVENTION

1. Technical Field

The present invention relates generally to safety devices and, more particularly, to fall arresting devices including retractable lifelines.

2. Background Information

Retractable lifeline safety devices generally include a housing containing a drum with a cable or rope wound onto it. The drum is spring biased to retract any of the cable that is unwound from it once tension on the cable is reduced. Also included within the housing is a brake system for stopping rotation of the drum if cable suddenly unwinds from it at a rate greater than a predetermined maximum angular velocity. The device may be mounted to a structure on which a worker is performing a task, such as a bridge or a building, with the end of the cable or rope being attached to the worker's belt or body harness. Alternatively, the device may be mounted directly to the worker's harness, with the other end of the cable being mounted to the structure on which the worker is working. Should the worker fall from the scaffolding or other surface on which the worker is standing, the brake system would gradually but quickly stop the drum from rotating, thus preventing additional cable from being paid out and breaking the fall of the worker. However, if the worker simply requires more cable to permit a greater range of motion within the work area, cable will be paid out as necessary. Conversely, as the worker approaches the safety device, the lifeline will be wound back onto the drum automatically due to the spring biased action of the drum.

A common problem with retractable lifeline safety devices of earlier forms is that the cable tends to act as a wick, drawing dirt and other contaminated materials into the inner assembly of the housing when the lifeline is rewound onto the drum. The dirt or other contaminants, such as asbestos, may foul the braking system, which may necessitate the disposal of the entire assembly, since many prior retractable lifeline safety devices are not easily repaired. This may happen with great frequency, since it is extremely important to inspect these assemblies for contamination frequently and dispose of them immediately when necessary, because of the nature of these devices as safety devices that are depended upon to save workers and others from serious injury or even death.

Prior art devices that illustrate these problems include that disclosed in U.S. Pat. No. 2,896,912 issued to Faugier et al. on Jul. 28, 1959. The safety apparatus disclosed therein shows a drum brake having two brake shoes, and a spiral spring, both the brake and the spring being exposed to the foreign matter potentially introduced into the system by the wicking action of the cable, as well as being exposed to moisture and other airborne contaminants that could lead to rust and corrosion. U.S. Pat. No. 2,990,131 issued to Carlsson on Jun. 27, 1961, although relying on a somewhat different braking system, suffers from the same drawbacks as the earlier reference.

The retractable lifeline safety device of the present invention overcomes the difficulties described above and affords other features and advantages heretofore not available.

SUMMARY OF THE INVENTION

The present invention includes a sealed housing that contains a brake assembly and biasing means for causing the drum to rotate in a retracting direction. Passing through the sealed housing is a main shaft about which the cable drum and sealed housing attached thereto rotate. The sealed housing portion also contains a viscous liquid such as oil to maintain constant lubrication of the parts contained therein. When lifeline is withdrawn from the cable drum, the drum rotates with the sealed housing. The biasing means contained within the sealed housing is keyed to the main shaft on one end and to the sealed housing on the other. The cable drum and the sealed housing are so connected that they rotate together about the main shaft without the possibility of foreign substances being introduced into the sealed housing. Since the main shaft is keyed to a main outer housing, the drum and sealed housing rotate around the main shaft, increasing the tension in the biasing means as the lifeline is paid out and resulting in the rewinding of the lifeline as tension is reduced on the lifeline.

An object of this invention is to provide a retractable lifeline safety device that will not be fouled and rendered ineffective during normal use due to the wicking action of the lifeline introducing dirt and other contaminants into the operating assembly of the device. A further object of this invention is to prevent the introduction of airborne contaminants and moisture to the operating assembly of the device, thus reducing the likelihood of rust and corrosion interfering with the proper performance of the safety device.

A further object of this invention is the prolonged usable life of the safety device due not only to the lack of foreign substances being introduced into the sealed housing where the mechanical components of the device are contained, but also due to the constant lubrication provided by the viscous liquid contained within the sealed housing.

Other objects and advantages of the invention will become apparent from the following detailed description and from the appended drawings in which like numbers have been used to describe like parts throughout the several views.

DESCRIPTION OF THE PREFERRED EMBODIMENT

Figures 1, 2:
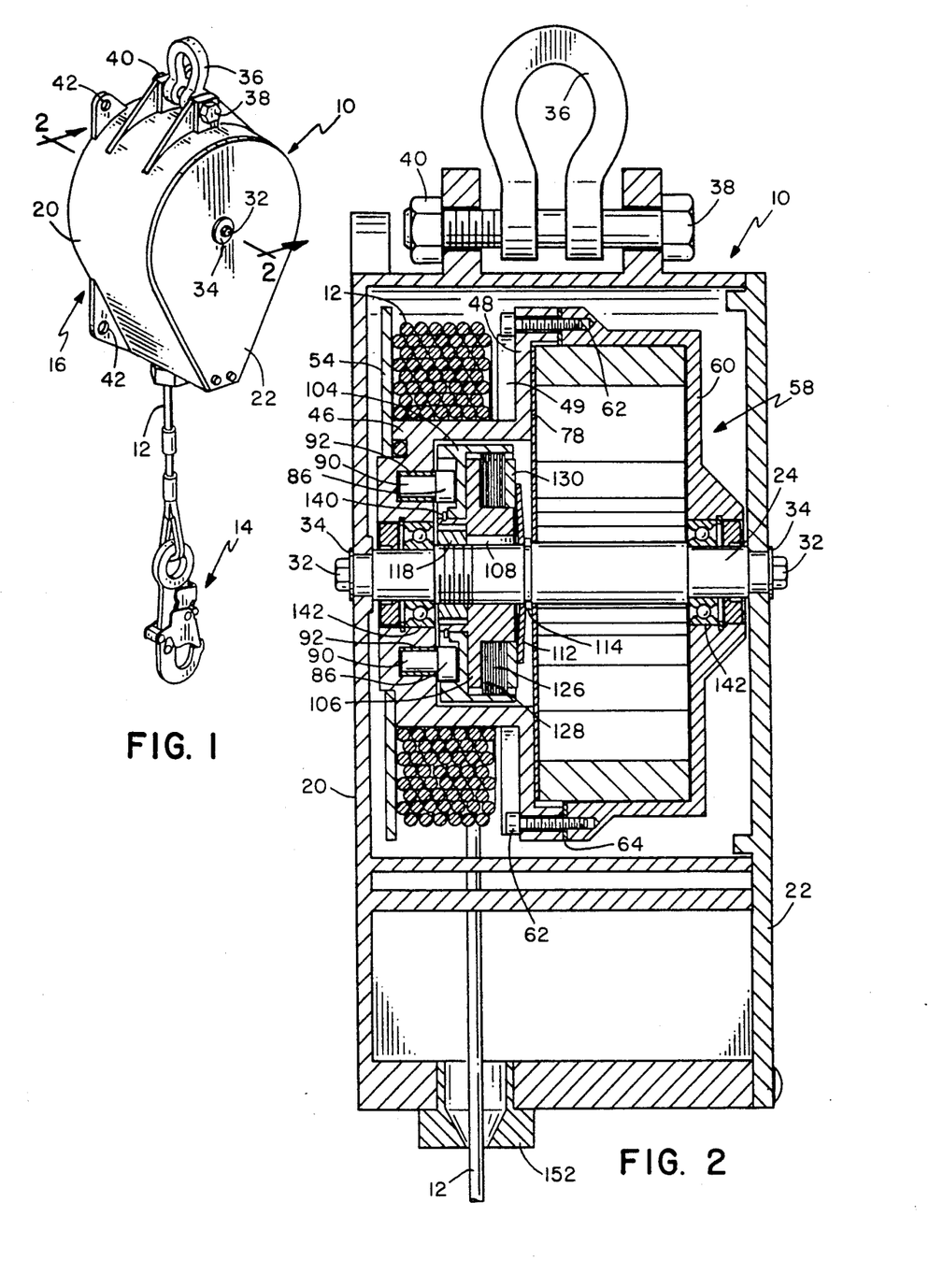
FIG. 1 is a perspective view of the retractable lifeline safety device showing the lifeline cable attached to a safety hook.
FIG. 2 is a section view of the retractable lifeline safety device taken along line 2—2 of FIG. 1.

With reference to the drawings, and in particular to FIG. 1, the retractable lifeline safety device is generally indicated by reference numeral 10. Safety device 10 includes a lifeline such as rope or cable 12 that may be withdrawn from safety device 10. To the end of cable 12 may be attached a fastening device such as snap hook 14 that is fastened to a belt or harness worn by a worker or other person performing a task at a great height above the ground.

Figures 9, 10, 11, 12:
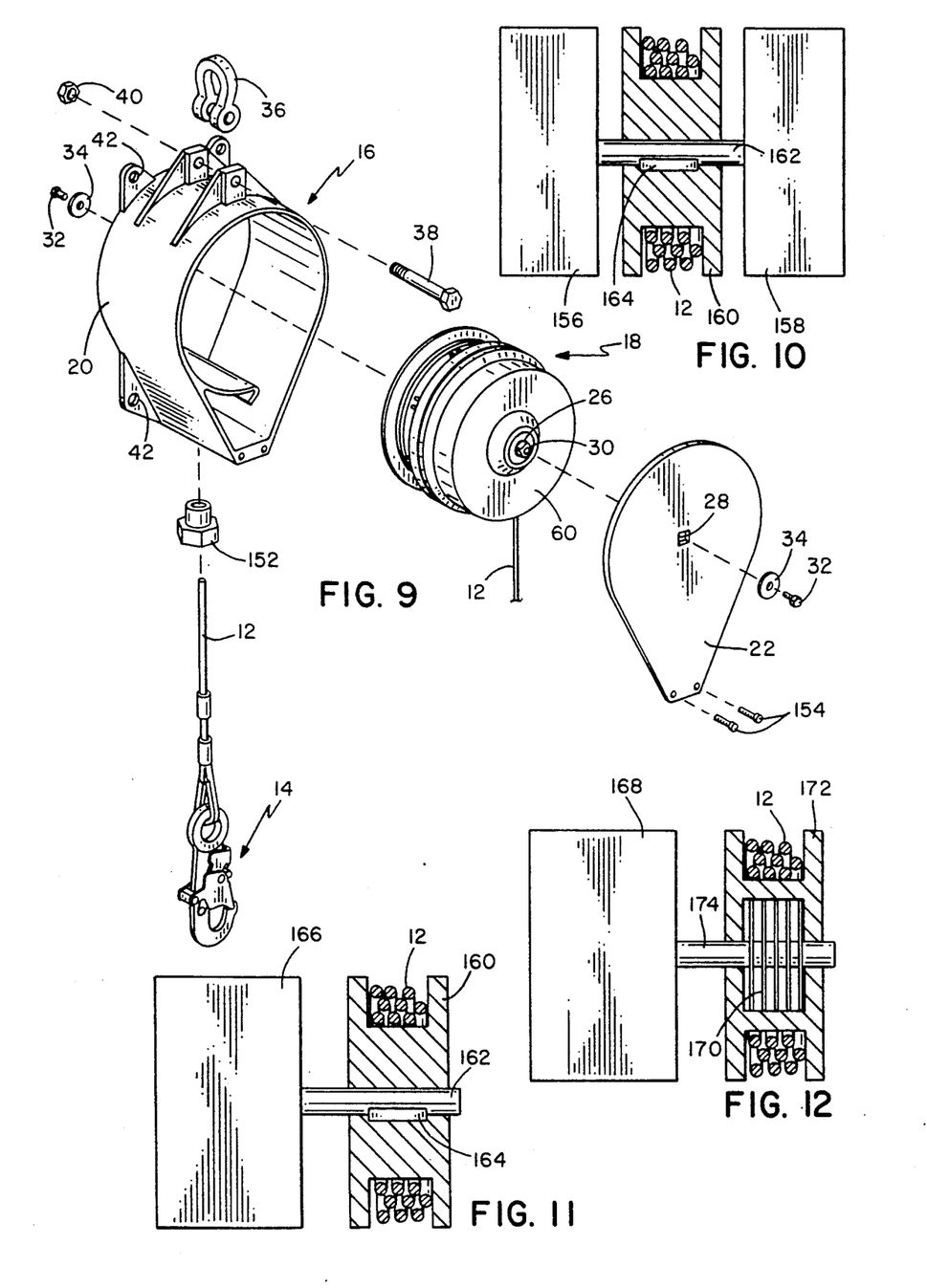
FIG. 9 is an exploded view of the retractable lifeline safety device with the internal block assembly assembled and prepared for installation within the outer housing.
FIG. 10 is a schematic of a first alternate configuration of the retractable lifeline safety device.
FIG. 11 is a schematic of a second alternate configuration of the retractable lifeline safety device.
FIG. 12 is a schematic of a third alternate configuration of the retractable lifeline safety device.

With reference to FIGS. 2 and 9, the preferred embodiment of safety device 10 includes an outer housing 16 and an internal block assembly 18. Outer housing 16 includes an outer housing shell 20 and an outer housing cover 22. Main shaft 24, to which internal block assembly 18 is rotatably mounted, is fixedly engaged to outer housing 16. Main shaft 24 has squared ends 26 that engage a first squared aperture 28 in outer housing cover 22 and a second squared aperture (not shown) in the wall of outer housing shell 20 opposing outer housing cover 22. Each end of main shaft 24 also includes a threaded countersunk bore 30 to which threaded nuts 32 and washers 34 are fastened to retain internal block assembly 18 in the proper position within outer housing 16.

Also attached to outer housing 16 is a shackle 36. Shackle 36 is fastened as by bolt 38 and nut 40 to the upper portion of outer housing shell 20 to enable safety device 10 to be hung from a structural element of the ladder, building, scaffolding or other structure on which the worker may be working. Alternatively, safety device 10 may be fastened as by holes 42 to a wall or other vertical surface if preferred.

Figure 3:
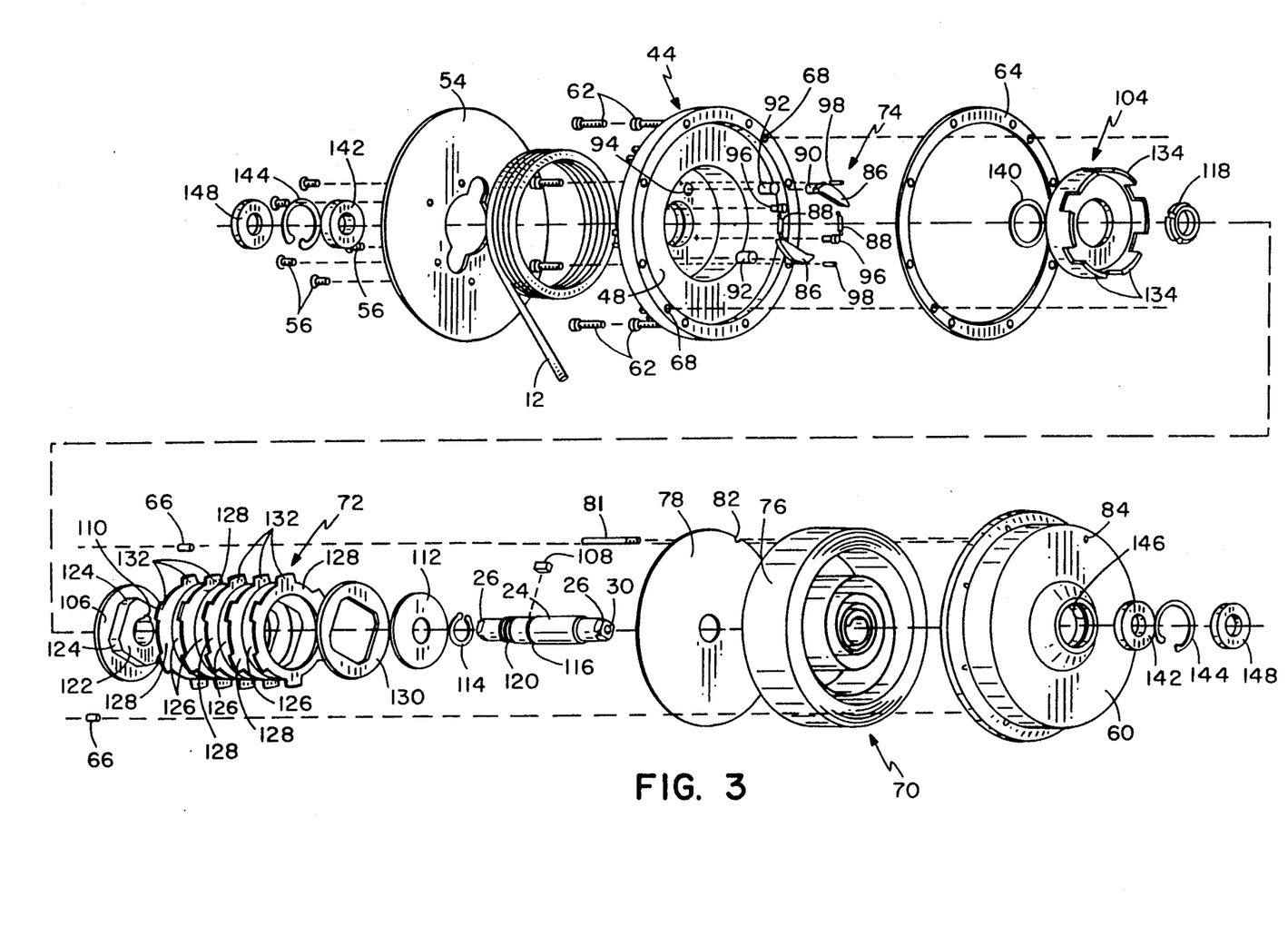
FIG. 3 is an exploded view of the internal block assembly of the retractable lifeline safety device.
Figures 4, 5, 6, 7, 8:
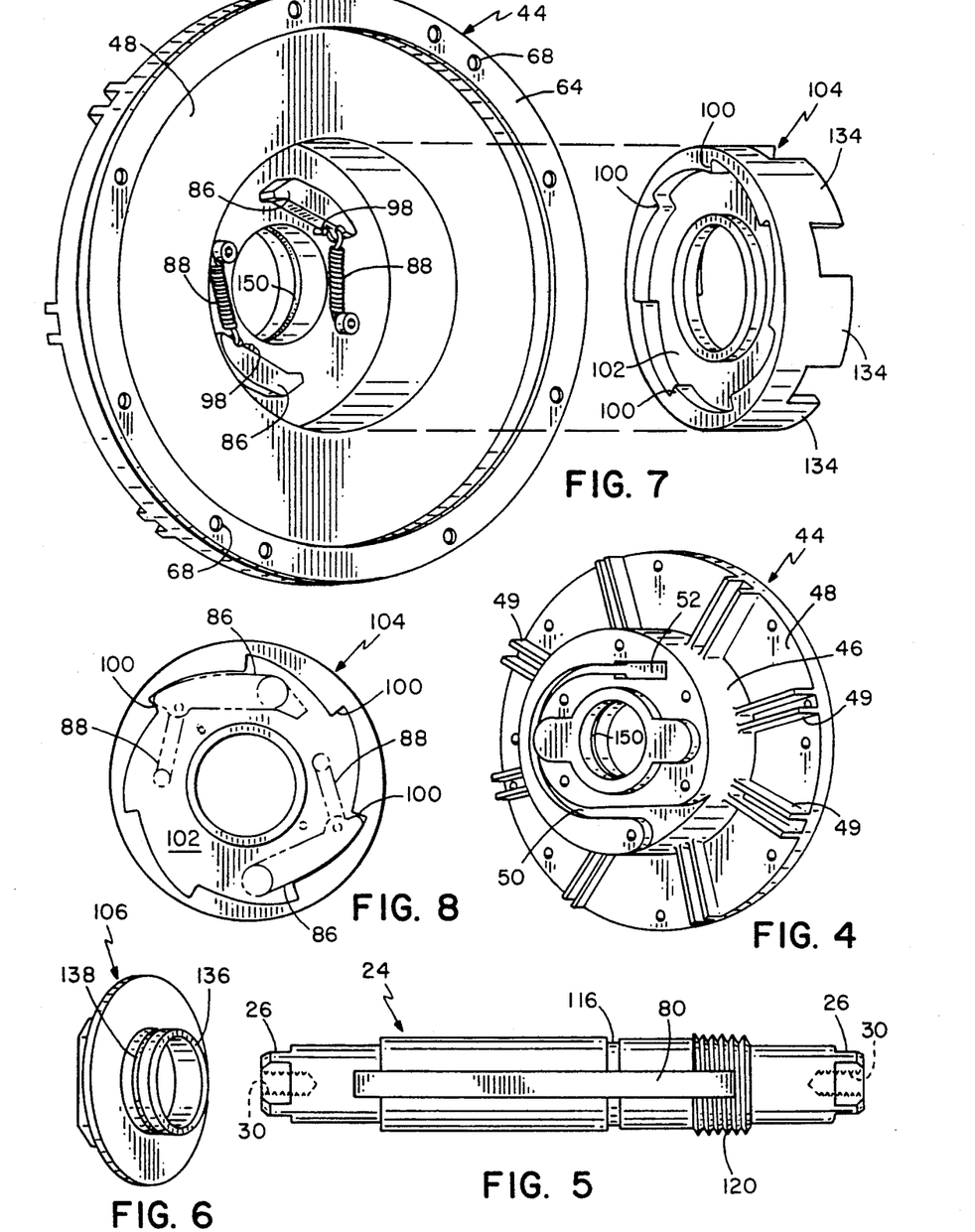
FIG. 4 is a front perspective view of the cable drum of the internal block assembly.
FIG. 5 is a detail plan view of the main shaft of the retractable lifeline safety device.
FIG. 6 is a front perspective view of the brake hub of the internal block assembly.
FIG. 7 is an exploded perspective view of the centrifugal clutch means of the brake assembly.
FIG. 8 is a front plan view of the ratchet surface of the brake driving hub showing the pawls of the centrifugal clutch means in phantom as they would appear when engaging the ratchet teeth of the ratchet surface.

Cable 12 is wound onto and off of cable drum 44. Cable drum 44 has a take-up portion 46, onto which cable 12 is gathered, and a flange portion 48. As shown in FIG. 4, flange portion 48 includes radial ribs 49 that reinforce flange portion 48. The end of cable 12 that is not withdrawn from internal block assembly 18 fits into a groove 50 that includes an expanded portion 52. The end of cable 12 has a stopper attached thereto (not shown) that fits into expanded groove portion 52 that prevents cable 12 from being entirely unwound from take-up portion 46 when cable drum cover 54 is attached to cable drum 44 as by screws 56, as shown in FIG. 3. Thus when cable 12 is wound onto cable drum 44, it is wound around take-up portion 46, and retained between radial ribs 49 of flange portion 48 and cable drum cover 54.

Referring to FIGS. 2 and 3, a sealed housing portion 58 is formed by attaching sealed housing cover 60 to the outer perimeter of cable drum 44 as by screws 62. Before attaching sealed housing cover 60 to cable drum 44, alignment pins 66 are pressed into alignment holes 68 on the outer perimeter of cable drum 44. Alignment pins 66 are aligned with complementary alignment holes (not shown) on the outer perimeter of sealed housing cover 60 to ensure that the components are properly aligned before assembly. Gasket 64 is installed intermediate sealed housing cover 60 and cable drum 44 to ensure the sealed nature of sealed housing portion 58.

Before assembling sealed housing portion 58, however, spring assembly 70 and brake assembly 72, including centrifugal clutch assembly 74, must be assembled and installed along main shaft 24. With reference to FIG. 3, spring assembly 70 includes spiral motor spring 76 positioned between isolation plate 78 and sealed housing cover 60. The edge of the first, inner end of motor spring 76 (not shown) is positioned in the slot 80 of main shaft 24 (FIG. 5), keeping that end of motor spring 76 stationary. The second, outer end of motor spring 76 is attached to sealed housing cover 60 and isolation plate 78 by mounting pin 81, which passes through a loop formed at the end of motor spring 76 (not shown), one end of which is positioned in notch 82 on the edge of isolation plate 78 and the other end of which is inserted into mounting pin hole 84 in sealed housing cover 60. With the second end of motor spring 76 anchored to and rotatable with sealed housing portion 58 and cable drum 44, motor spring 76 uncoils as cable drum 44 and sealed housing portion 58 rotate in response to the unwinding of cable 12 from take-up portion 46 of cable drum 44. Motor spring 76 maintains a continuous turning force on main shaft 24 and thus cable drum 44 so that cable 12 continuously tends to be wound up upon cable drum 44.

Referring to FIGS. 3, 7 and 8, centrifugal clutch assembly 74 includes two pawls 86 and one spring 88 for each pawl 86. The rotating shaft 90 of pawls 86 rotates within sleeve bearing 92, which is inserted within aperture 94 within cable drum 44. Springs 88 are retained in position by screws 96, and spring pins 98 limit the inward travel of pawls 86 caused by the contraction of springs 88. When cable drum 44 reaches a predetermined rate of rotation due to the unwinding of cable 12 from take-up portion 46, pawls 86 overcome the contraction force of springs 88, and engage the ratchet teeth 100 of ratchet surface 102 of brake driving hub 104.

Engagement of the brake driving hub 104 by centrifugal clutch assembly 74 activates the rest of brake assembly 72. Brake assembly 72 includes brake driving hub 104 and brake hub 106. Brake hub 106 is fixedly mounted to main shaft 24 by means of a key 108 that fits in slot 80 of main shaft 24. Key 108 mates with hub bore slot 110 (FIG. 3) to prevent brake hub 106 from rotating. As shown in FIGS. 2 and 3, compressible washer 112 and retaining ring 114 prevent brake assembly 72 from sliding along main shaft 24 toward spring assembly 70. Retaining ring 114 is positioned in circumferential groove 116 of main shaft 24 (FIG. 5). Retaining ring 114 also serves, of course, to maintain spring assembly 70 in its proper position along main shaft 24. While compressible washer 112 tends to direct brake assembly 72 away from spring assembly 70, brake assembly 72 is prevented from sliding along main shaft 24 toward cable drum 44 by self-locking nut 118, which is threadedly engaged to threaded portion 120 of main shaft 24, and rides against key 108 and brake hub 106. Brake hub 106 has a generally rectangular projecting portion 122 with rounded corners 124. Mounted to projecting portion 122 are several stator friction discs 126 and rotor friction discs 128. Stator discs 126 have generally rectangular bores that correspond with generally rectangular projecting portion 122 of brake hub 106. Alternating with stator friction discs 126 are circular rotor friction discs 128, with circular inside diameters, permitting them to rotate about the rounded corners 124 of generally rectangular projecting portion 122 of brake hub 106. Finally, a braking pressure plate 130 is provided that is somewhat thicker than stator discs 126 and rotor discs 128. The present embodiment is shown with four stator discs 126 and five rotor discs 128, although the number of discs may vary depending on dimensional considerations, braking requirements and the frictional properties of materials used for the discs. Rotor discs 128 also include radially projecting ears 132 that register with longitudinally projecting portions 134 of brake driving hub 104.

The central bore of brake driving hub 104 rotatably engages the circular projection 136 of brake hub 106 (FIG. 6). Circular projection 136 of brake hub 106 includes an annular groove 138. Upon mounting brake driving hub 104 to circular projection 136 of brake hub 106, retaining ring 140 is slid over circular projection 136 until it engages annular groove 138, securely positioning brake driving hub 104 on brake hub 106.

To assemble sealed housing portion 58, self-locking nut 118 is engaged with threaded portion 120 of main shaft 24. After properly positioning stator discs 126, rotor discs 128 and braking pressure plate 130 on brake hub 106, brake driving hub 104 is positioned on brake hub 106, and retaining ring 140 is inserted into annular groove 138 of brake hub 106. Compressible washer 112 is then positioned on the shaft adjacent brake assembly 72, and retaining ring 114 is installed in circumferential groove 116 of main shaft 24. After assembling spring assembly 70, but before mounting spring assembly 70 to main shaft 24, a bearing assembly 142 is inserted within the central opening in sealed housing cover 60, followed by retaining ring 144, which is positioned in internal annular groove 146 in sealed housing cover 60. Finally, oil seal 148 is inserted into the central opening, and spring assembly 70 is ready to install on main shaft 24.

Before installing cable drum 44 on main shaft 24, retaining ring 144 is inserted into internal annular groove 150 of cable drum 44. Retaining ring 144 separates bearing assembly 142 and oil seal 148 in the central opening of cable drum 44. Gasket 64 may now be placed between cable drum 44, including centrifugal clutch assembly 74, and sealed housing cover 60, being careful to align properly these pieces as indicated by alignment pins 66 mating with alignment holes 68. Once properly aligned, screws 62 may be inserted to fasten cable drum 44 to sealed housing cover 60. It is essential, however, to fill sealed housing portion 58 with a suitable viscous liquid, such as standard motor oil, before all the gaskets and oil seals are installed. Viscous liquid filling the sealed housing portion 58 maintains all the moving parts in properly lubricated condition, reducing wear due to friction and reducing the likelihood of corrosion, increasing the working life and effectiveness of retractable lifeline safety device 10.

Cable drum cover 54 is attached to cable drum 44, and cable 12 is wound onto take-up portion 46 of cable drum 44. Internal block assembly 18 is now fully assembled. As shown in FIG. 9, internal block assembly 18 may now be placed within outer housing shell 20, and cable 12 may be threaded through guide bushing 152. Outer housing cover 22 may be positioned for attachment to outer housing shell 20, being careful that squared ends 26 of main shaft 24 are properly positioned with regard to squared apertures 28 of outer housing shell 20 and outer housing cover 22. Internal block assembly 18 and outer housing cover 22 are then attached using washers 34, threaded nuts 32 and screws 154.

Alternate embodiments of retractable lifeline safety device 10 are illustrated schematically in FIGS. 10-12. Each of these configurations provides the essential benefit of the preferred embodiment illustrated in FIGS. 1-9, which centers around keeping the mechanical components of the safety device isolated in a sealed housing where they may be constantly lubricated in a bath of viscous liquid, and that which does not allow dirt and other contaminants, including corrosion-inducing vapors, fumes and other airborne particles to penetrate the inner assemblies. While none of these schematics illustrate the use of an outer housing, it should be understood that one should be provided. FIG. 10 illustrates an embodiment in which sealed box 156 contains the brake assembly and sealed box 158 contains the spring assembly. Cable drum 160 is fixedly linked to rotatable main shaft 162 by key 164. In principle, the brake assembly of sealed box 156 operates similarly to brake assembly 72 of the main embodiment, including the use of a centrifugal clutch assembly (ratchet ring and pawls) that activates braking forces between non-rotatable stator friction discs and rotatable rotor friction discs in a brake assembly. Similarly, the spring assembly of sealed box 158 includes a motor spring that is keyed to main shaft 162 on one end and the housing portion of sealed box 158 on the other, the motor spring maintaining a continuous turning force on main shaft 162 and thus cable drum 160 so that cable 12 continuously tends to be wound up upon cable drum 160.

FIG. 11 illustrates an embodiment in which sealed box 166 contains both the brake assembly, including the centrifugal clutch assembly, and the motor spring assembly. Cable drum 160 is again fixedly mounted to rotatable main shaft 162 by key 164.

Finally, FIG. 12 illustrates an embodiment in which sealed box 168 contains the centrifugal clutch mechanism and the motor spring assembly, but brake disc assembly 170, including stator friction discs and rotor friction discs, are contained within cable drum 172, which is fixedly mounted to rotatable main shaft 174.

In use, retractable lifeline safety device 10 is attached by shackle 36 to an element of the structure on which a worker or other person is performing a task at a great height above the ground. Snap hook 14 or a similar device is attached to the end of cable lifeline 12, and is then attached to a belt or harness worn by the worker or other person who is performing the task. Safety device 10 permits a free range of motion on the part of the worker, as long as the worker does not away from safety device 10 a distance greater than the length of cable 12 provided by safety device 10. Due to the continuous turning force exerted by spiral motor spring 76, cable 12 is automatically rewound onto take-up portion 46 of cable drum 44 as the worker walks closer to safety device 10.

In the event that the worker should fall, the high rate of speed at which cable drum 44 turns to pay out cable 12 in response thereto causes pawls 86 to overcome the contracting force of springs 88, and pawls 86 engage ratchet teeth 100 of ratchet surface 102 on brake driving hub 104. Brake driving hub 104, which is rotatably mounted to main shaft 24 but normally does not rotate about main shaft 24, begins to rotate with cable drum 44. Once pawls 86 have engaged ratchet teeth 100 of ratchet surface 102, they cannot become disengaged until cable drum 44 begins to rotate backward to rewind cable 12 onto take-up portion 46. Upon the rotation of brake driving hub 104, longitudinal projecting portions 134 engage radially projecting ears 132 of rotor friction discs 128, causing rotor discs 128 also to rotate with cable drum 44. As rotor discs 128 rotate, they frictionally engage non-rotatable stator friction discs 126, the assembly of discs being tightly engaged between brake hub 106 and braking pressure plate 130 with the help of compressible washer 112. The friction between stator discs 126 and rotor discs 128 of brake assembly 72, combined with the increasing compressive force being exerted by motor spring 76, brakes the fall of the worker by braking the rotation of internal block assembly 18 within outer housing 16.

While the preferred embodiments of the invention have been described, it should be understood that various changes, adaptations, and modifications may be made therein without departing from the spirit of the invention and the scope of the appended claims.

What is claimed is:

1. A fall arresting device, comprising:
   support means;
   a main shaft passing through said support means, the ends of said main shaft being non-rotatably connected to two opposing portions of said support means;
   a sealed housing contained within said support means and rotatably mounted to said main shaft;
   a drum fixedly attached to said sealed housing in rotatable relation about said main shaft, said drum also being contained within said support means;
   cable means wound onto said drum, said cable means having a first end extending from said support means and a second end fixed to said drum;
   spring means contained within said sealed housing biasing said sealed housing in a retracting direction, whereby when said cable means is unwound from said drum, said spring means biases said drum in a direction tending to rewind said cable means onto said drum; and
   brake means contained within said sealed housing, whereby when said drum and said sealed housing attached thereto rotate at a rate greater than a predetermined rate due to the unwinding of said cable means from said drum, said brake means tends to brake the rotation of said drum, said brake means including: centrifugal clutch means; a brake driving hub rotatably mounted to said main shaft; a brake hub non-rotatably mounted to said main shaft; a plurality of rotor discs rotatably mounted to said brake hub; and a plurality of stator discs non-rotatably mounted to said brake hub.

2. The fall arresting device as recited in claim 1, wherein said spring means comprises:
   a spiral motor spring.

3. The fall arresting device as recited in claim 2, wherein said centrifugal clutch means comprises:
   at least one pawl mounted on an inner wall of said sealed housing and pivotable into engagement with said brake driving hub in response to the rate of rotation of said sealed housing exceeding said predetermined rate; and
   means biasing said at least one pawl away from engagement with said brake driving hub when the rate of rotation of said sealed housing is less than said predetermined rate.

4. The fall arresting device as recited in claim 3, wherein said brake driving hub further comprises:
   a ratchet surface on a side of said brake driving hub opposed to said at least one pawl and having ratchet teeth engageable with said at least one pawl.

5. The fall arresting device as recited in claim 4, wherein:
   said brake driving hub includes a peripheral radius and a central projecting portion projecting along said main shaft;
   said brake driving hub includes a plurality of longitudinal projecting portions along said peripheral radius thereof, said projecting portions projecting generally away from said ratchet surface of said brake driving hub, each said projecting portion forming an arc along a circle concentric with the axis of said main shaft;
   said rotor discs are rotatably mounted to said central projecting portion of said brake driving hub and include a peripheral radius;
   said rotor discs include a plurality of radially projecting ears around said peripheral radius thereof, said radially projecting ears engageable with said longitudinal projecting portions of said brake driving hub; and
   said stator discs are non-rotatably mounted to said central projecting portion of said brake driving hub, said stator discs further mounted alternatingly between said rotor discs, whereby when the rate of rotation of said drum and said sealed housing exceeds said predetermined rate, said at least one pawl engages said teeth of said ratchet surface of said brake driving hub, causing said brake driving hub to rotate with said drum and said sealed housing, and causing said rotor discs to engage frictionally said stator discs, causing said drum and said sealed housing to stop rotating about said main shaft.

6. A fall arresting device, comprising:
   support means;
   a first sealed housing contained within and fixedly attached to said support means;
   a second sealed housing contained within and fixedly attached to said support means;
   a main shaft passing between said first sealed housing and said second sealed housing, said main shaft rotatably connected to said first sealed housing and said second sealed housing;
   a drum fixedly attached to said main shaft and located intermediate said first sealed housing and said second sealed housing;
   cable means wound onto said drum, said cable means having a first end extending from said support means and a second end fixed to said drum;
   brake means contained within said first sealed housing, whereby when said main shaft and said drum attached thereto rotate at a rate greater than a predetermined rate due to the unwinding of said cable means from said drum, said brake means tends to brake the rotation of said main shaft; and
   spring means contained within said second sealed housing biasing said main shaft and said drum attached thereto in a retracting direction, whereby when said cable means is unwound from said drum, said spring means biases said main shaft and said drum attached thereto in a direction tending to rewind said cable means onto said drum.

7. The fall arresting device as recited in claim 6, wherein:
said first sealed housing is filled with a viscous liquid; and
said second sealed housing is filled with a viscous liquid.

8. The fall arresting device as recited in claim 6, wherein said spring means comprises:
a spiral motor spring.

9. The fall arresting device as recited in claim 8, wherein said brake means further comprises:
centrifugal clutch means;
a brake driving hub rotatably mounted to said main shaft;
a brake hub fixedly mounted to said first sealed housing;
a plurality of rotor discs rotatably mounted to said brake hub; and
a plurality of stator discs non-rotatably mounted to said brake hub.

10. The fall arresting device as recited in claim 9, wherein said centrifugal clutch means comprises:
a centrifugal clutch support member fixedly attached to said main shaft;
at least one pawl mounted on said centrifugal clutch support member and pivotable into engagement with said brake driving hub in response to the rate of rotation of said main shaft exceeding said predetermined rate; and
means biasing said at least one pawl away from engagement with said brake driving hub when the rate of rotation of said main shaft housing is less than said predetermined rate.

11. The fall arresting device as recited in claim 10, wherein said brake driving hub further comprises:
a ratchet surface on a side of said brake driving hub opposed to said at least one pawl and having ratchet teeth engageable with said at least one pawl.

12. The fall arresting device as recited in claim 11, wherein:
said brake driving hub includes a peripheral radius and a central projecting portion projecting along said main shaft;
said brake driving hub includes a plurality of longitudinal projecting portions along said peripheral radius thereof, said projecting portions projecting generally away from said ratchet surface of said brake driving hub, each said projecting portion forming an arc along a circle concentric with the axis of said main shaft;
said rotor discs are rotatably mounted to said central projecting portion of said brake driving hub and include a peripheral radius;
said rotor discs include a plurality of radially projecting ears around said peripheral radius thereof, said radially projecting ears engageable with said longitudinal projecting portions of said brake driving hub; and
said stator discs are non-rotatably mounted to said central projecting portion of said brake driving hub, said stator discs further mounted alternatingly between said rotor discs, whereby when the rate of rotation of said main shaft and said drum attached thereto exceeds said predetermined rate, said at least one pawl engages said teeth of said ratchet surface of said brake driving hub, causing said brake driving hub to rotate with said main shaft and said drum, and causing said rotor discs to engage frictionally said stator discs, causing said main shaft and said drum to stop rotating.

13. A fall arresting device, comprising:
support means;
a sealed housing contained within and fixedly attached to said support means;
a main shaft having a first end and a second end, said first end of said main shaft rotatably connected to said sealed housing and said second end of said main shaft rotatably connected to said support means;
a drum fixedly attached to said main shaft and located intermediate said first end of said main shaft and said second end of said main shaft;
cable means wound onto said drum, said cable means having a first end extending from said support means and a second end fixed to said drum;
brake means contained within said sealed housing, whereby when said main shaft and said drum attached thereto rotate at a rate greater than a predetermined rate due to the unwinding of said cable means from said drum, said brake tends to brake the rotation of said main shaft, said brake means including: centrifugal clutch means; a brake driving hub rotatably mounted to said main shaft; a brake hub fixedly mounted to said sealed housing; a plurality of rotor discs rotatably mounted to said brake hub; and a plurality of stator discs non-rotatably mounted to said brake hub; and
spring means contained within said sealed housing biasing said main shaft and said drum attached thereto in a retracting direction, whereby when said cable means is unwound from said drum, said spring means biases said main shaft and said drum attached thereto in a direction tending to rewind said cable means onto said drum.

14. The fall arresting device as recited in claim 13, wherein said spring means comprises:
a spiral motor spring.

15. The fall arresting device as recited in claim 14, wherein said centrifugal clutch means comprises:
a centrifugal clutch support member fixedly attached to said main shaft;
at least one pawl mounted on said centrifugal clutch support member and pivotable into engagement with said brake driving hub in response to the rate of rotation of said main shaft exceeding said predetermined rate; and
means biasing said at least one pawl away from engagement with said brake driving hub when the rate of rotation of said main shaft housing is less than said predetermined rate.

16. The fall arresting device as recited in claim 15, wherein said brake driving hub further comprises:
a ratchet surface on a side of said brake driving hub opposed to said at least one pawl and having ratchet teeth engageable with said at least one pawl.

17. The fall arresting device as recited in claim 16, wherein:
said brake driving hub includes a peripheral radius and a central projecting portion projecting along said main shaft;
said brake driving hub includes a plurality of longitudinal projecting portions along said peripheral radius thereof, said projecting portions projecting generally away from said ratchet surface of said brake driving hub, each said projecting portion forming an arc along a circle concentric with the axis of said main shaft;

said rotor discs are rotatably mounted to said central projecting portion of said brake driving hub and include a peripheral radius;

said rotor discs include a plurality of radially projecting ears around said peripheral radius thereof, said radially projecting ears engageable with said longitudinal projecting portions of said brake driving hub; and said stator discs are non-rotatably mounted to said central projecting portion of said brake driving hub, said stator discs further mounted alternatingly between said rotor discs, whereby when the rate of rotation of said main shaft and said drum attached thereto exceeds said predetermined rate, said at least one pawl engages said teeth of said ratchet surface of said brake driving hub, causing said brake driving hub to rotate with said main shaft and said drum, and causing said rotor discs to engage frictionally said stator discs, causing said main shaft and said drum to stop rotating.

18. A fall arresting device, comprising:

support means;

a sealed housing contained within and fixedly attached to said support means;

a main shaft having a first end and a second end, said first end of said main shaft rotatably connected to said sealed housing and said second end of said main shaft rotatably connected to said support means;

a drum rotatably attached to said main shaft and located intermediate said first end of said main shaft and said second end of said main shaft;

cable means wound onto said drum, said cable means having a first end extending from said support means and a second end fixed to said drum;

brake means contained within said drum, whereby when said main shaft and said drum attached thereto rotate at a rate greater than a predetermined rate due to the unwinding of said cable means from said drum, said brake means tends to brake the rotation of said main shaft;

centrifugal clutch means contained within said sealed housing and fixedly attached to said main shaft; and spring means contained within said sealed housing biasing said main shaft and said drum attached thereto in a retracting direction, whereby when said cable means is unwound from said drum, said spring means biases said main shaft and said drum attached thereto in a direction tending to rewind said cable means onto said drum.

19. The fall arresting device as recited in claim 18, wherein:

said sealed housing is filled with a viscous liquid.

20. The fall arresting device as recited in claim 18, wherein said spring means comprises:

a spiral motor spring.

21. The fall arresting device as recited in claim 20, wherein said brake means further comprises:

a plurality of rotor discs fixedly mounted to said drum; and a plurality of stator discs fixedly mounted to said main shaft.

22. The fall arresting device as recited in claim 21, wherein said centrifugal clutch means comprises:

a brake driving hub fixedly mounted to said sealed housing;

a centrifugal clutch support member fixedly attached to said main shaft;

at least one pawl mounted on said centrifugal clutch support member and pivotable into engagement with said brake driving hub in response to the rate of rotation of said main shaft exceeding said predetermined rate; and means biasing said at least one pawl away from engagement with said brake driving hub when the rate of rotation of said main shaft housing is less than said predetermined rate.

23. The fall arresting device as recited in claim 22, wherein said brake driving hub further comprises:

a ratchet surface on a side of said brake driving hub opposed to said at least one pawl and having ratchet teeth engageable with said at least one pawl, whereby when the rate of rotation of said main shaft and said drum attached thereto exceeds said predetermined rate, said at least one pawl engages said teeth of said ratchet surface of said brake driving hub, stopping the rotation of said main shaft and causing said rotor discs to engage frictionally said stator discs, causing said drum to stop rotating.

* * * * *